(12) United States Patent
Yu

(10) Patent No.: US 10,963,843 B2
(45) Date of Patent: Mar. 30, 2021

(54) PATROL TRACKING SYSTEM

(71) Applicant: Chao-Cheng Yu, Taoyuan (TW)

(72) Inventor: Chao-Cheng Yu, Taoyuan (TW)

(*) Notice: Subject to any disclaimer, the term of this patent is extended or adjusted under 35 U.S.C. 154(b) by 195 days.

(21) Appl. No.: 16/250,506

(22) Filed: Jan. 17, 2019

(65) Prior Publication Data

US 2020/0234247 A1    Jul. 23, 2020

(51) Int. Cl.
| *G06Q 10/10* | (2012.01) |
| *G06F 16/901* | (2019.01) |
| *H04W 4/80* | (2018.01) |
| *H04W 4/029* | (2018.01) |
| *H04L 29/08* | (2006.01) |

(52) U.S. Cl.
CPC ....... *G06Q 10/1091* (2013.01); *G06F 16/901* (2019.01); *H04L 67/306* (2013.01); *H04W 4/029* (2018.02); *H04W 4/80* (2018.02)

(58) Field of Classification Search
CPC ... G06Q 10/1091; G06F 16/901; H04W 4/80; H04W 4/029; H04W 4/025; H04L 67/306
See application file for complete search history.

(56) References Cited

U.S. PATENT DOCUMENTS

| 9,820,120 | B2 * | 11/2017 | deCharms | ........... H04L 65/1059 |
| 10,325,461 | B1 * | 6/2019 | Roberts | ................. G08B 13/196 |
| 10,748,076 | B1 * | 8/2020 | Dabell | ............. G08G 1/096716 |

| 2007/0118739 | A1 * | 5/2007 | Togashi | ................. G06Q 10/10 713/158 |
| 2013/0183924 | A1 * | 7/2013 | Saigh | .................... H04W 4/025 455/404.2 |
| 2017/0270461 | A1 * | 9/2017 | Morgenthau | ...... H04W 52/0216 |
| 2017/0294053 | A1 * | 10/2017 | Kao | ......................... G07C 1/20 |
| 2018/0182179 | A1 * | 6/2018 | Teh | ........................ G07C 1/20 |
| 2019/0066058 | A1 * | 2/2019 | Spurgeon | ............. G06Q 40/125 |
| 2019/0259003 | A1 * | 8/2019 | Angenica | .............. H04W 4/021 |
| 2019/0287071 | A1 * | 9/2019 | Sundar | ............... G06Q 10/1091 |
| 2020/0042950 | A1 * | 2/2020 | Gulden | ............. G06Q 10/0633 |
| 2020/0174517 | A1 * | 6/2020 | Martinez | ........... G06Q 10/0635 |

FOREIGN PATENT DOCUMENTS

| CN | 102915575 A | * | 2/2013 |
| CN | 103093511 A | * | 5/2013 |
| CN | 106204784 A | * | 12/2016 |

* cited by examiner

*Primary Examiner* — Ashford S Hayles
(74) *Attorney, Agent, or Firm* — WPAT, PC

(57) ABSTRACT

A patrol tracking system is disclosed, comprising an NFC carrier, a handheld device and a cloud server equipment, wherein the NFC carrier can be placed at a patrol location such that an administrator can scan the NFC carrier by means of the control unit of the handheld device, accordingly establish an NFC device setup file, and then upload it to the cloud server equipment; afterwards, when a patroller arrives at the patrol location, it is possible to use the handheld device to scan the NFC carrier, and, upon completing the scanning operation, create a patrol record file including relevant GPS coordinates, and then upload it to the cloud server equipment such that the back-end administrator can exactly manage and control the actual patrol location of the patroller thereby achieving the purpose of precise and credible patrol inspections.

9 Claims, 24 Drawing Sheets

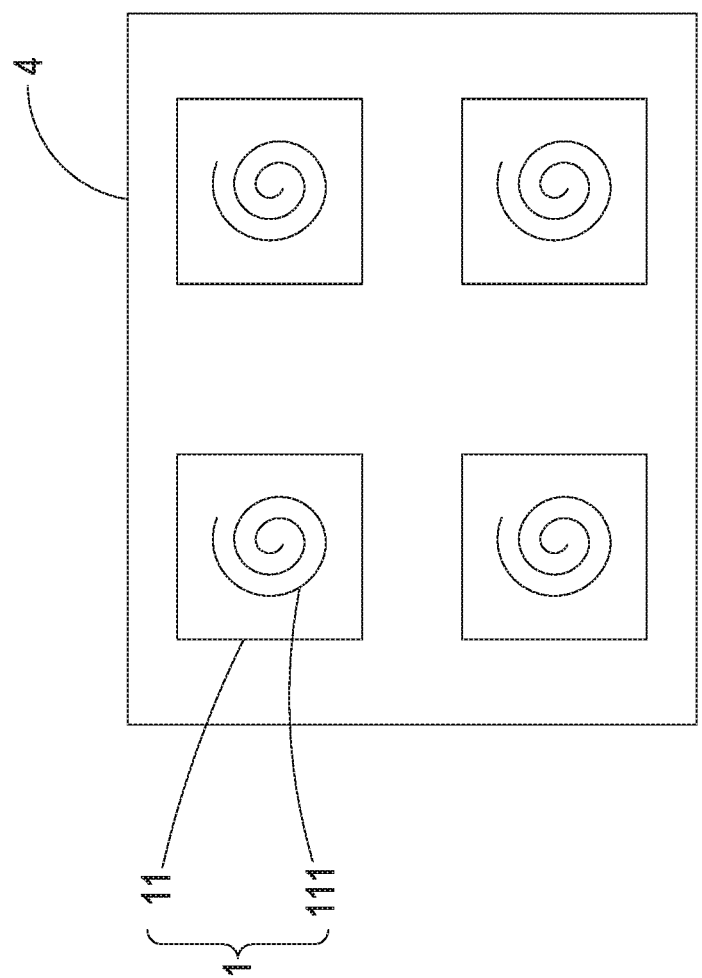

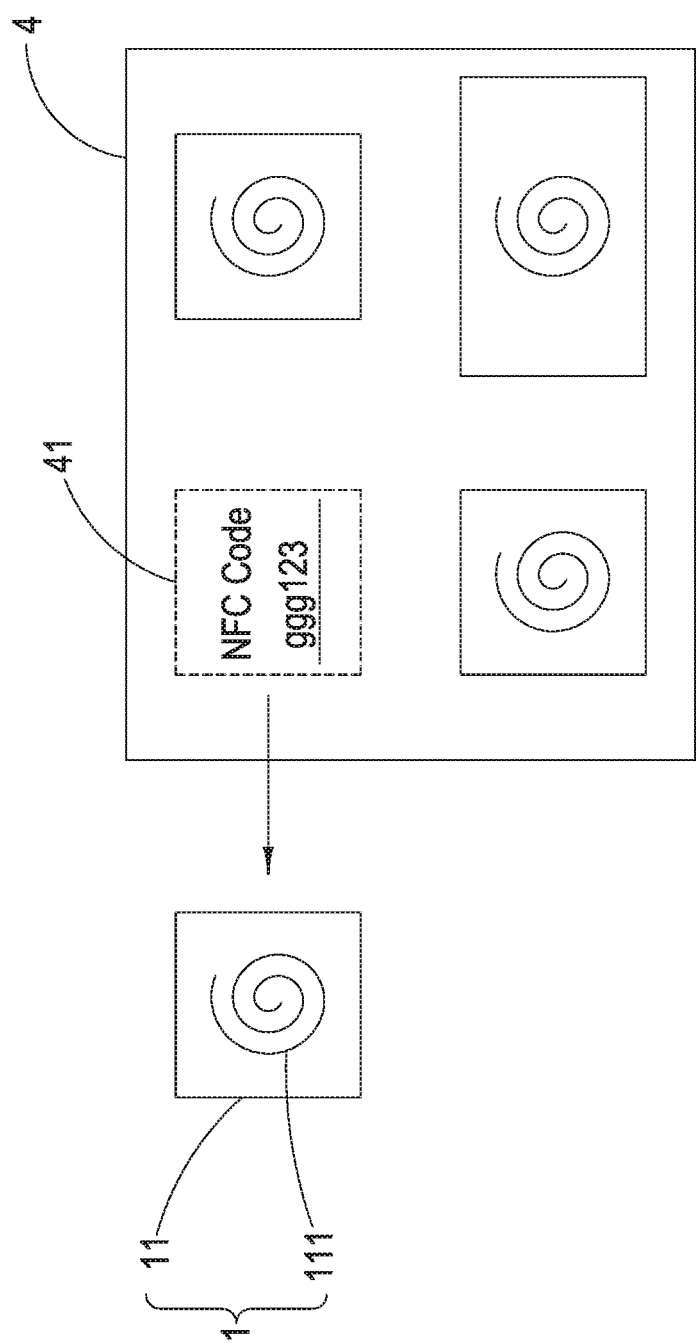

PATROL TRACKING SYSTEM

BACKGROUND OF THE INVENTION

1. Field of the Invention

The present invention generally relates to a patrol tracking system; in particular, it concerns a patrol tracking system characterized in installing an NFC carrier at a patrol location, generating a patrol record file of a coordinate by means of the GPS on a handheld device to transfer to a cloud server equipment, and then, by means of verifying the acquired coordinate, determining whether a patroller accurately arrives at a specific patrol location on time for the inspection check-in process.

2. Description of Related Art

The well-known "NFC" represents the abbreviation for "Near Field Communication" indicating a type of wireless technology initially proposed by the Philips Company and promoted collaboratively by Nokia and several other major companies in relevant fields in the year 2003, and, afterwards, many enterprises, universities and customers jointed to establish a pan-Europe alliance for this technology. The NFC essentially applies the single-chip technologies and allows to combine various devices such as sensor card readers, sensor cards etc. so as to provide the point-to-point function thereby operating at a certain frequency range within a short distance.

Therefore, the NFC allows information communications between a mobile phones and other NFC devices, e.g., mobile phones, NFC labels and payment devices so that, through this NFC mechanism, data can be successfully shared between devices having the NFC circuit and mobile phones.

Due to the low price characteristics of NFC, if an NFC carrier can be placed at an inspection site and paired with suitable electronic device software, it is possible to effectively manage and control the patrol inspections. However, since the NFC carriers are mostly mobile, in case that a patroller improperly collects the NFC carriers from different locations in advance, and then scans them at a specific point in time, such a loophole may cause the system unable to correctly appreciate whether the patroller has actually carried out the inspection processes or not; i.e., some shortcomings still exist.

Therefore, in the present application, in addition to the above-said NFC carrier, a GPS positioning mechanism is conjunctively provided as well. As such, when the setup patrol time is near, it is possible to inform a patroller of a reminder message for inspection processes, and, after the patroller truly arrives at the inspection location and scans the NFC carrier, a patrol record file containing relevant GPS coordinates can be automatically created and uploaded to the cloud, so that the back-end administrator can clearly understand whether the patroller's patrol-and-scan location is correct or not, thereby controlling and managing the inspection states of different patrol locations all the time; in this way, the present invention can be an optimal solution.

SUMMARY OF THE INVENTION

A patrol tracking system according to the present invention is disclosed, comprising: an NFC carrier, internally having an NFC circuit which corresponds to an activation label, and installed at a patrol location; a handheld device, including a screen unit, a GPS unit, an NFC scanner unit and a control unit, in which the control unit is connected to the screen unit, the GPS unit and the NFC scanner unit and includes: an interface management module, used to provide multiple operation interfaces shown on the screen unit; an account log-in module, connected to the interface management module for logging in a user account; a data archive module, connected to the account log-in module for creating an NFC device setup file, in which the NFC device setup file includes an NFC data, a basic data, patrol location coordinates and/or setup picture file; an identification authentication module, connected to the NFC scanner unit, the interface management module and the data archive module, and used to input or scan one or more activation labels on the operation interface, and, after scanning the NFC carrier by means of the handheld device, capable of acquiring the NFC data transferred by the NFC circuit, so that the identification authentication module can determine whether the NFC data is identical to the contents of the activation label; a basic data setup module, connected to the interface management module, the identification authentication module and the data archive module, which, after the identification authentication module determining that the NFC data is identical to the contents of the activation label, is able to input one or more basic data on the operation interface; a coordinate setup module, connected to the GPS unit, the interface management module and the data archive module, and used to acquire one or more patrol location coordinates via the GPS unit; a patrol confirmation module, connected to the NFC scanner unit, the GPS unit and the interface management module, and used to scan the NFC carrier so as to, after completing the scanning, generate a patrol record file which includes at least the patrol location coordinates and scanning time points; a data upload module, connected to the data archive module and the patrol confirmation module, and used to upload the NFC device setup file and the patrol record file; and a cloud server equipment, connected to the control unit of the handheld device and comprising: an account management unit, used to store and establish one or more user accounts and passwords, in which the user account is the account of the administrator and/or the patroller; a setup file storage unit, used to receive and store one or more NFC device setup files which correspond to the account of an administrator; and a patrol record unit, connected to the setup file storage unit in order to receive and store one or more patrol record files, and capable of matching the NFC setup file which the patrol record files correspond to in the setup file storage unit based on the contents of the patrol location coordinates and accordingly generating a patrol record list.

In a preferred embodiment, the handheld device further includes a microphone unit and a speaker unit connected to the control unit, and the control unit also further includes voice setup module connected to the microphone unit, the interface management module and the data archive module for recording or choosing one or more reminder voice files; then, after scanning the NFC carrier by means of the patrol confirmation module, the reminder voice file can be played via the speaker unit.

In a preferred embodiment, the handheld device further includes a camera unit connected to the control unit, and the control unit also further includes a picture setup module connected to the camera unit, the interface management module and the data archive module for photographing or choosing one or more setup picture files.

In a preferred embodiment, the control unit further includes an information display module connected to the interface management module for displaying one or more information contents on the operation interface, and such information contents may be texts, images, symbols or a combination of at least two of them.

In a preferred embodiment, the cloud server equipment further includes a patrol reminder unit connected to the setup file storage unit thereby determining whether the configured reminder time is near or expires based on the contents consisting of a reminder time limit data, a reminder notification approach data and a reminder notification number data so as to send out a reminder message.

In a preferred embodiment, the patrol reminder unit sends out the reminder message by way of mobile phone texting or email deliveries.

In a preferred embodiment, the control unit further includes a reminder time limit setup module connected to the interface management module and the data archive module for inputting or choosing one or more reminder time limit data.

In a preferred embodiment, the control unit further includes a reminder notification approach setup module connected to the interface management module and the data archive module for inputting or choosing one or more reminder notification approach data.

In a preferred embodiment, the control unit further includes a reminder notification number setup module connected to the interface management module and the data archive module for inputting or choosing one or more reminder notification number data.

In a preferred embodiment, the NFC carrier is a sticker component, a magnetic lock, a key ring, a pendant or a card.

BRIEF DESCRIPTION OF THE DRAWINGS

FIG. 2A shows a view of the sticker components in the patrol tracking system according to the present invention.

FIG. 2B shows an implementation view of a revealed label after opening a sticker component in the patrol tracking system according to the present invention.

FIG. 3-2 shows a flowchart of adding steps in the patrol tracking system according to the present invention.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1A:
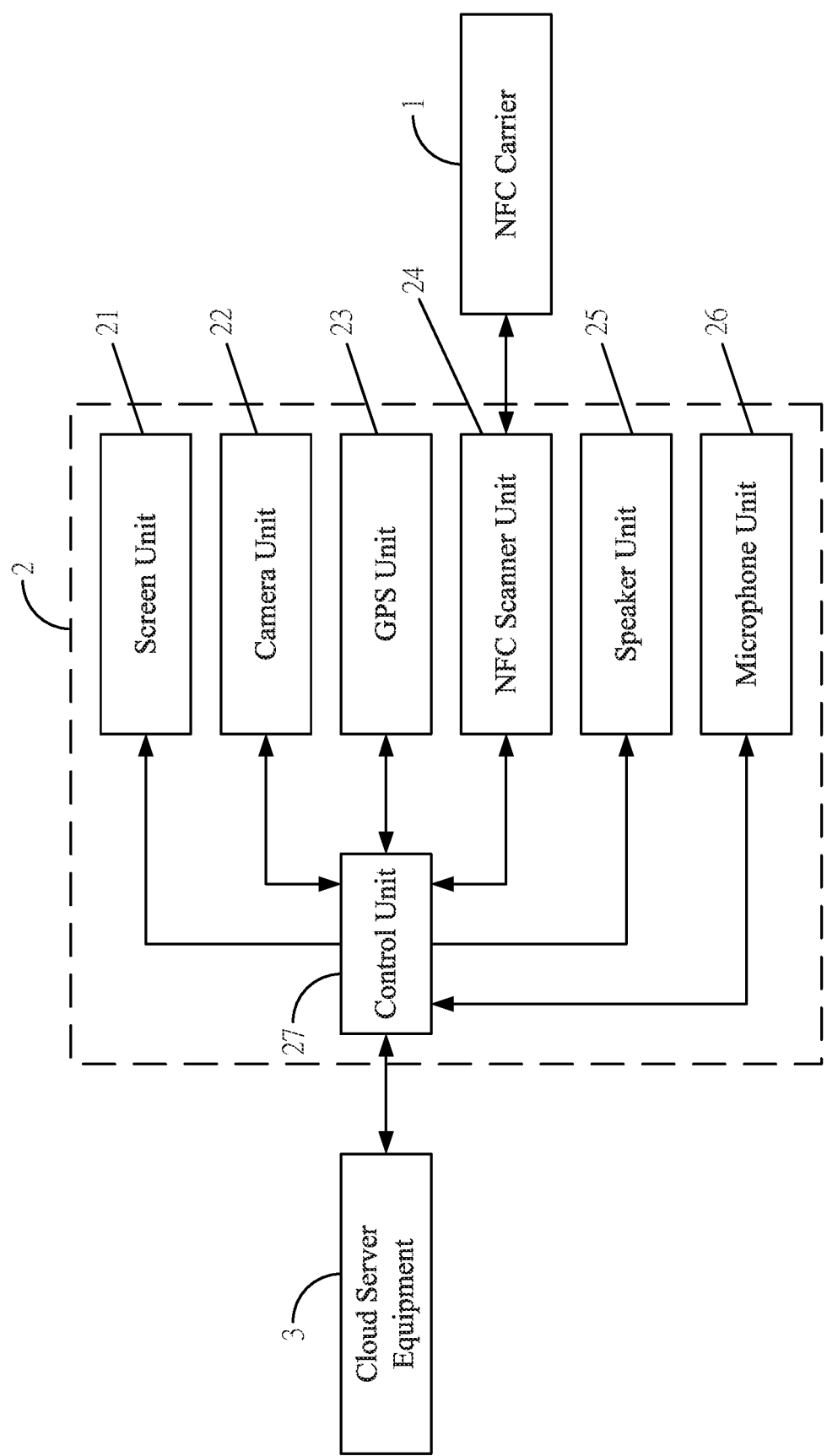
FIG. 1A shows an overall architecture view of the patrol tracking system according to the present invention.
Figure 1B:
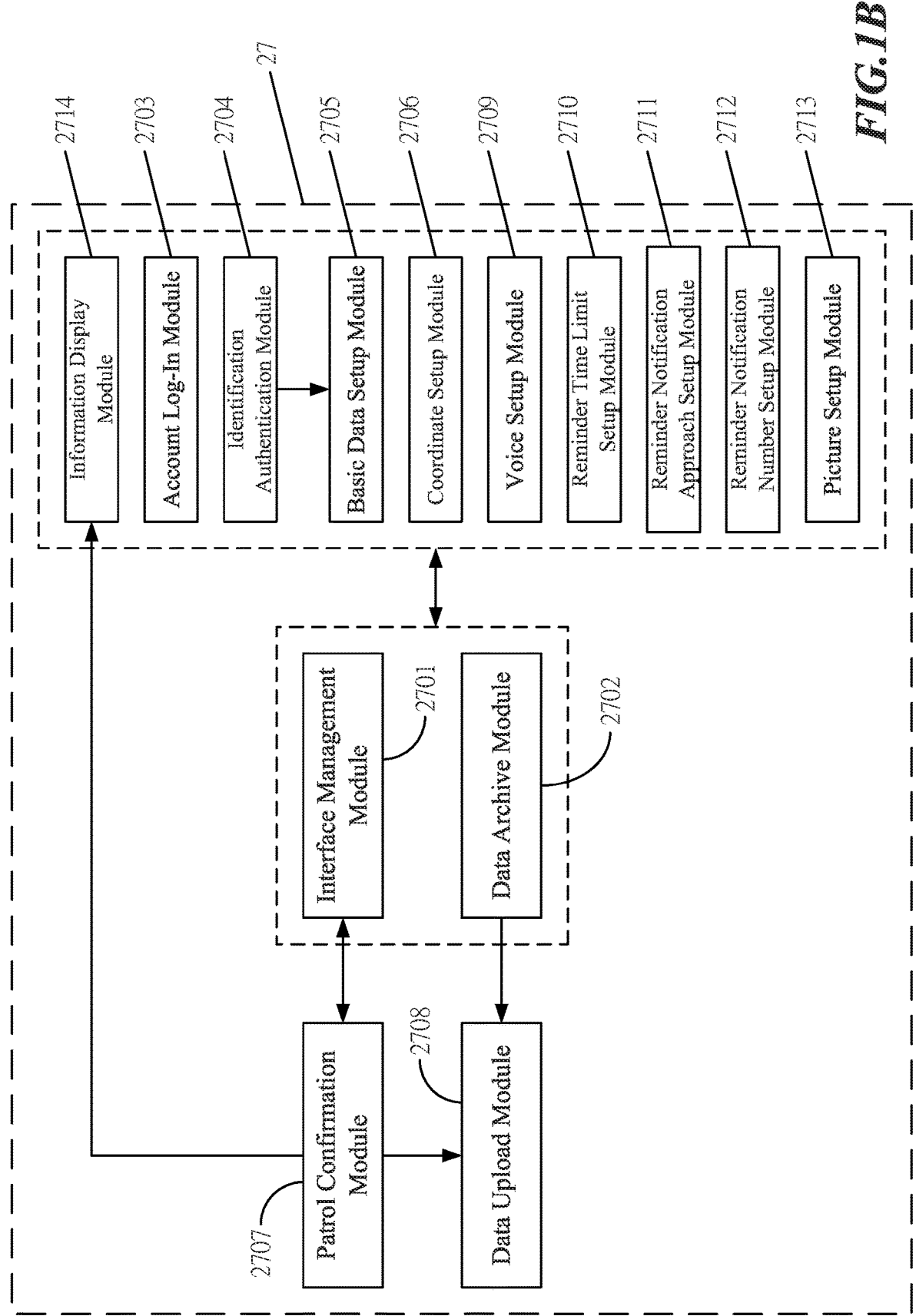
FIG. 1B shows an architecture view of the control unit in the patrol tracking system according to the present invention.
Figure 1C:
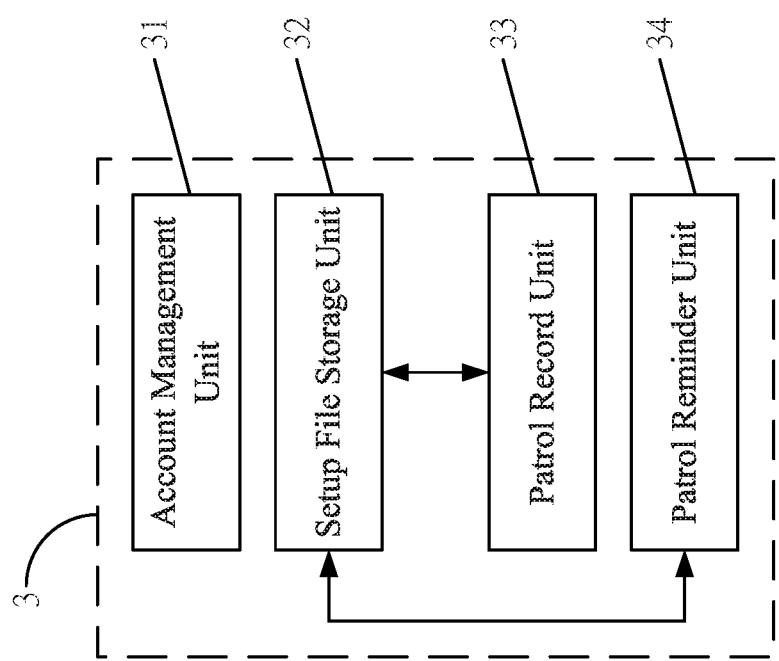
FIG. 1C shows an architecture view of the cloud server equipment in the patrol tracking system according to the present invention.

Refer first to FIGS. 1A, 1B and 1C, wherein a patrol tracking system according to the present invention is shown. It can be seen from the Figures that the illustrated system comprises an NFC carrier 1, a handheld device 2 and a cloud server equipment 3, in which the NFC carrier 1 includes an NFC electronic circuit corresponding to an activation label and is to be placed at a patrol location; it should be understood that there can be multiple NFC carriers, and the activation labels that each NFC carrier respectively corresponds to may be the same or different.

The handheld device 2 includes a screen unit 21, a camera unit 22, a GPS unit 23, an NFC scanner unit 24, a speaker unit 25, a microphone unit 26 and a control unit 27, wherein the control unit 27 is connected to the screen unit 21, the camera unit 22, the GPS unit 23, the NFC scanner unit 24, the speaker unit 25 and the microphone unit 26; herein the handheld device 2 may be a smartphone, a pad computer or a certain mobile electronic device.

Also, as shown in FIG. 1B, the control unit includes an interface management module 2701, an account log-in module 2703, a data archive module 2702, an identification authentication module 2704, a basic data setup module 2705, a coordinate setup module 2706, a patrol confirmation module 2707, a data upload module 2708, a voice setup module 2709, a reminder time limit setup module 2710, a reminder notification approach setup module 2711, a reminder notification number setup module 2712, a picture setup module 2713 and an information display module 2714.

Herein the interface management module 2701 can be used to display one or more operation interfaces 27011 on the screen unit 21. The data archive module 2702 is used to build an NFC device setup file which includes an NFC data, a basic data, a patrol location coordinate, a reminder voice file, a reminder time limit data, a reminder notification approach data, a reminder notification number data and/or a setup picture file.

In addition, the account log-in module 2703 can be applied to log in a user account which can be the account of an administrator and/or a patroller; and the identification authentication module 2704 allows to input or scan one or more activation labels on the operation interface 27011, and, after scanning the NFC carrier 1 by means of the NFC scanner unit 24 in the handheld device 2, it is possible to acquire the NFC data transferred by the NFC electronic circuit 11, while the identification authentication module 2704 can determine whether the NFC data is identical to the contents of the activation label.

Also, if the basic data setup module 2705 determines the NFC data is identical to the contents of the activation label, it is possible to input one or more basic data on the operation interface 27011, wherein the basic data includes at least the name data and/or location data; meanwhile, the coordinate setup module 2706 can obtain one or more patrol location coordinates through the GPS unit 23.

Besides, the patrol confirmation module 2707 allows to scan the NFC carrier 1 via the NFC scanner unit 24, and, after completing the scanning, to play the reminder voice file by ways of the speaker unit 25 and generate a patrol record file which includes at least the patrol location coordinates and the scanning time points.

The data upload module 2708 can upload the above-said NFC setup file and the patrol record file to the cloud server equipment 3; additionally, the voice setup module 2709 can record or choose one or more reminder voice files.

The reminder time limit setup module 2710 can be used to input or choose one or more reminder time limit data, in which the reminder time limit data may include fields such as year, month and time; besides, the remind notification approach setup module 2711 allows to input or choose one or more reminder notification approach data which may exemplarily include email notifications or mobile phone pushes.

The reminder notification number setup module 2712 can input or choose one or more reminder notification number data which may include the single reminding, consistent multi-reminding or else reminding at a certain time interval; also, the picture setup module 2713 allows to photograph or choose one or more setup picture files.

Moreover, the information display module 2714 is used to display one or more information contents on the operation interface, in which the information contents may include texts, images, symbols or a combination thereof, and be shown in a marquee mode so as to display a variety of information contents such as advertisements, notes, remarks or alerts etc.

As shown in FIG. 1C, the cloud server equipment 3 may comprise an account management unit 31, a setup file storage unit 32, a patrol record unit 33 and a patrol reminder unit 34, wherein the account management unit 31 can store and build one or more user accounts and corresponding passwords, the setup file storage unit 32 can receive and store one or more NFC device setup files which respectively correspond to one or more administrator's accounts.

Meanwhile, the patrol record unit 33 can receive and store one or more patrol record files, and capable of matching the NFC setup file which the patrol record files correspond to in the setup file storage unit 32 based on the contents of the patrol location coordinates and accordingly generating a patrol record list.

Further, the patrol reminder unit 34 allows to determine whether the configured reminding time is near or expires based on the contents including the reminder time limit data, the reminder notification approach data as well as the reminder notification number data, thus accordingly sending out a reminder message, in which the patrol reminder unit 34 can transfer the reminder message by means of mobile phone texting or email deliveries, and, if the message is sent via emails, then in addition to the handheld device 2, it is also possible to utilize other types of electronic devices capable of reading emails or accessing the pushed electronic information for this purpose.

Herein the NFC carrier 1 can be a sticker component, a magnetic lock, a key ring ornament, a pendant or a card (or the NFC carrier 1 may be further combined with more than one lamp); for example, it may be sticker component which includes an NFC electronic circuit there under and may be attached onto any objects at a specific patrol location.

Figure 2C:
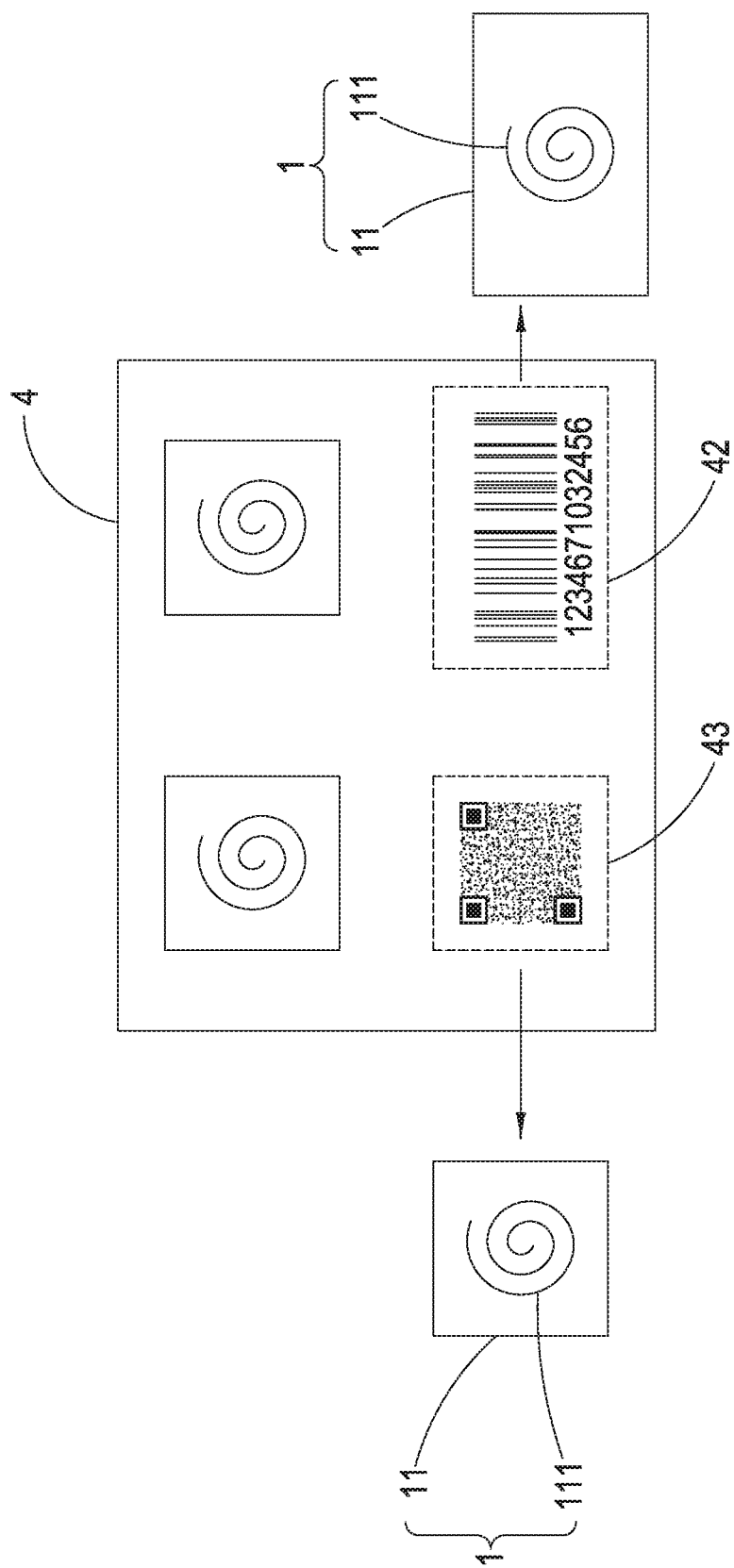
FIG. 2C shows another implementation view of revealed labels after opening sticker components in the patrol tracking system according to the present invention.

Subsequently, as shown in FIGS. 2A, 2B and 2C, the sticker component 11 includes an NFC electronic circuit 111, and plural sticker components 11 are conjunctively attached onto a release paper 4, as illustrated in FIG. 2B, such that, upon tearing off the sticker component 11, the release paper 4 displays an activation label which may be a symbol label 41 (e.g., a combination of texts, symbols and/or numbers); meanwhile, the activation label can be further a barcode label, as shown in FIG. 2C, so that, by tearing off the sticker component 11, the release paper 41 can reveal a one-dimensional barcode label 42 or a two-dimensional barcode label 43.

Figures 1, 3:
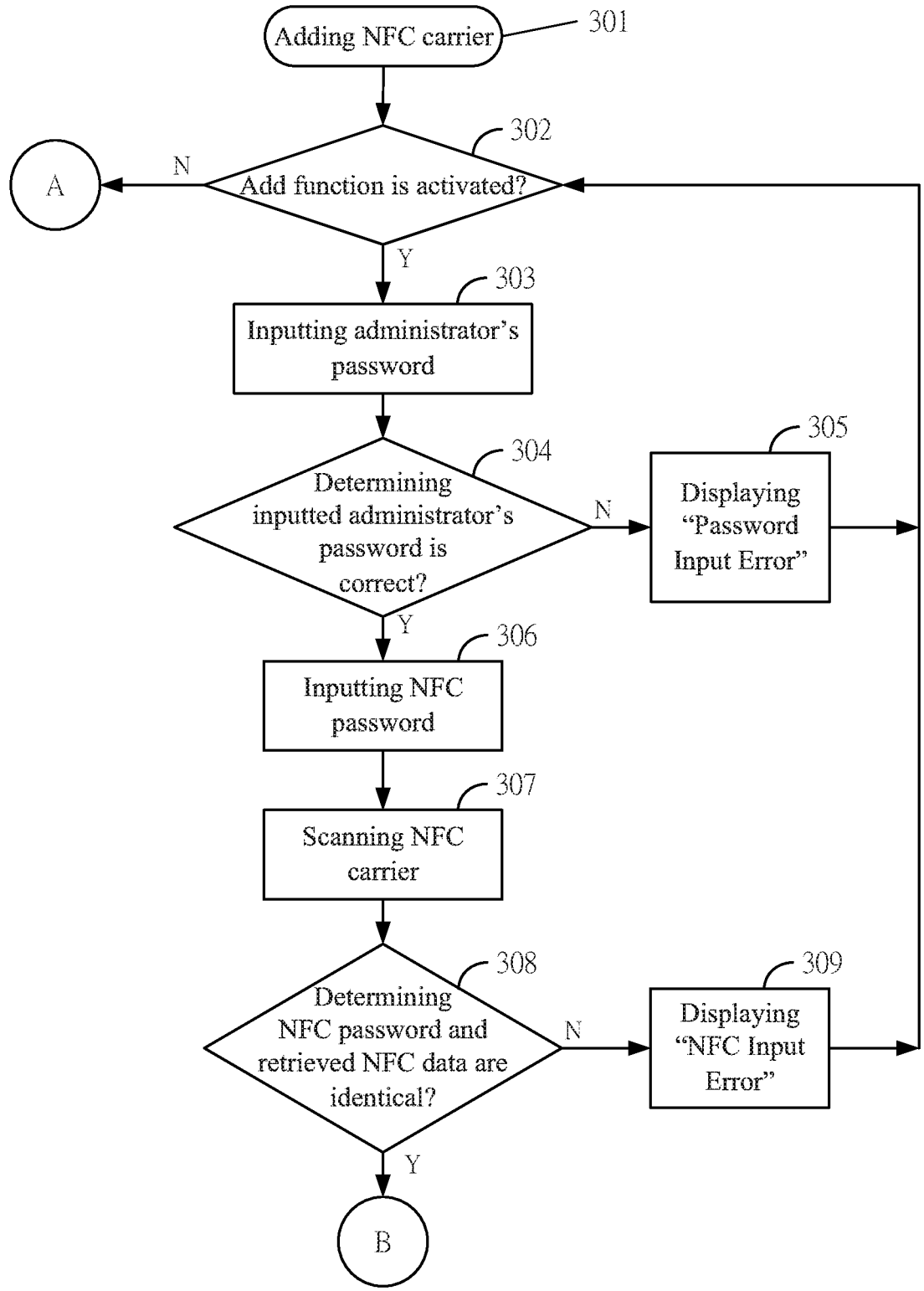
FIG. 3-1 shows a flowchart of adding steps in the patrol tracking system according to the present invention.
Figures 2, 3:
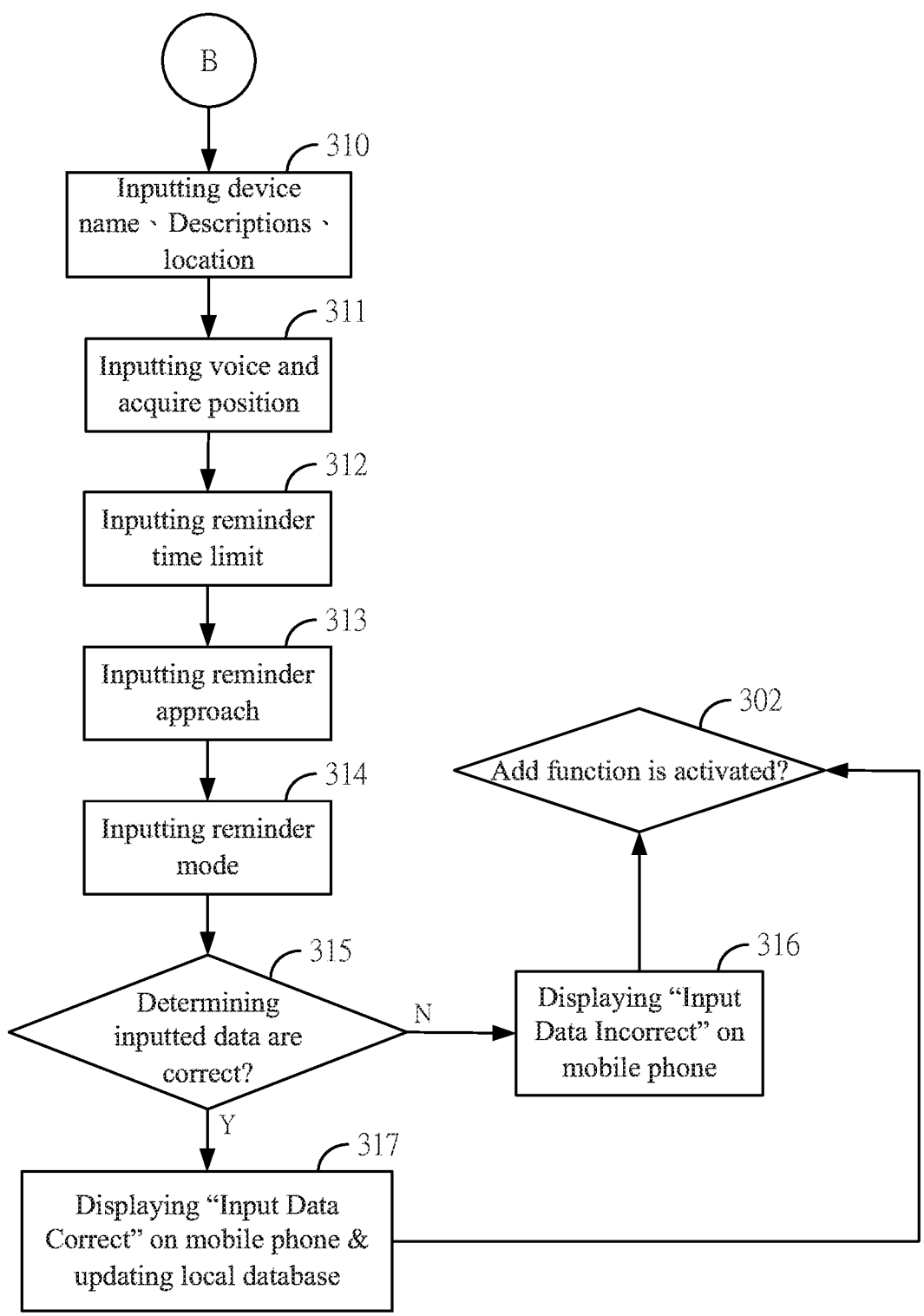

Upon adding a new device, the process thereof can be shown in FIGS. 3-1 and 3-2, comprising the following steps:

(1) To add an NFC carrier (301), first determining whether the add function is activated or not (302); if determined NO, proceeding to another flow process (A); if determined YES, prompting to input the administrator's password (activation label) (303);

(2) afterwards, further determining whether the administrator's password is correct (304); if incorrect, displaying "Password Input Error" (305); if correct, inputting NFC password (306);

(3) then, scanning the NFC carrier (307) in order to acquire the NFC data transferred by the NFC electronic circuit, and determining whether the NFC data and the contents of the activation label are identical (308); if determined NO, displaying responses like "NFC Input Error" etc. on the operation interface of the reminder Control Unit (309);

(4) however, if determined the NFC data and the contents of the activation label are identical, proceeding to the flow process (B) thereby starting to input the device name, remarks and location (310), then inputting voice and acquiring positioning (311), inputting reminder time limit (312), inputting reminder approach (313) and inputting reminder mode (314);

(5) finally, determining whether the entered data is correct (315); if incorrect, displaying responses such as "Incorrect Input Data" etc. on the operation interface (316); but, if correct, then displaying responses such as "Correct Input Data" etc. on the operation interface and updating the host database (data stored in the reminder Control Unit) (317).

(6) besides, if STEPs 306, 309 and 316 are determined to be incorrect, returning to STEP 302 to retry.

Figure 4A:
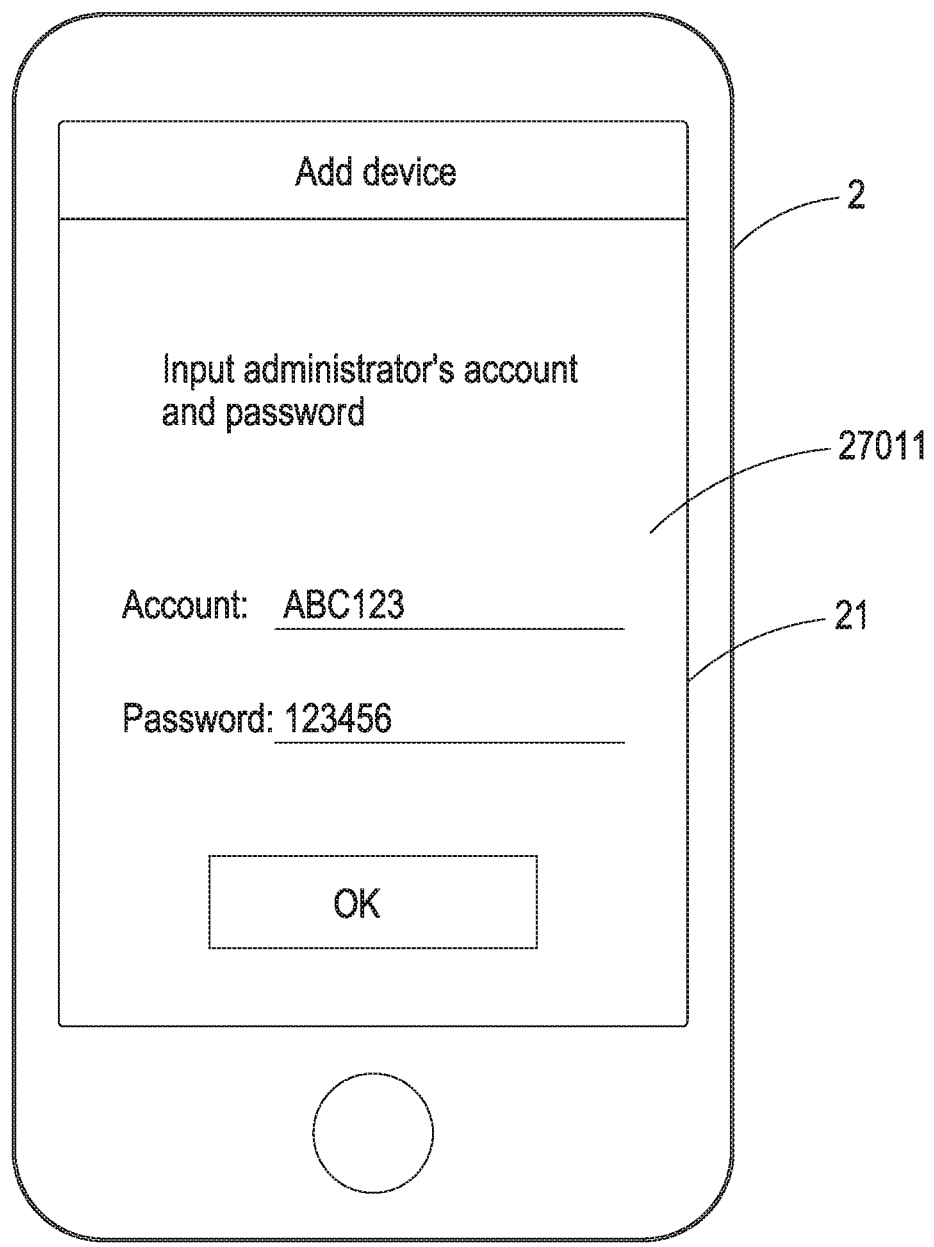
FIG. 4A shows an implementation view of adding devices in the patrol tracking system according to the present invention.
Figure 4B:
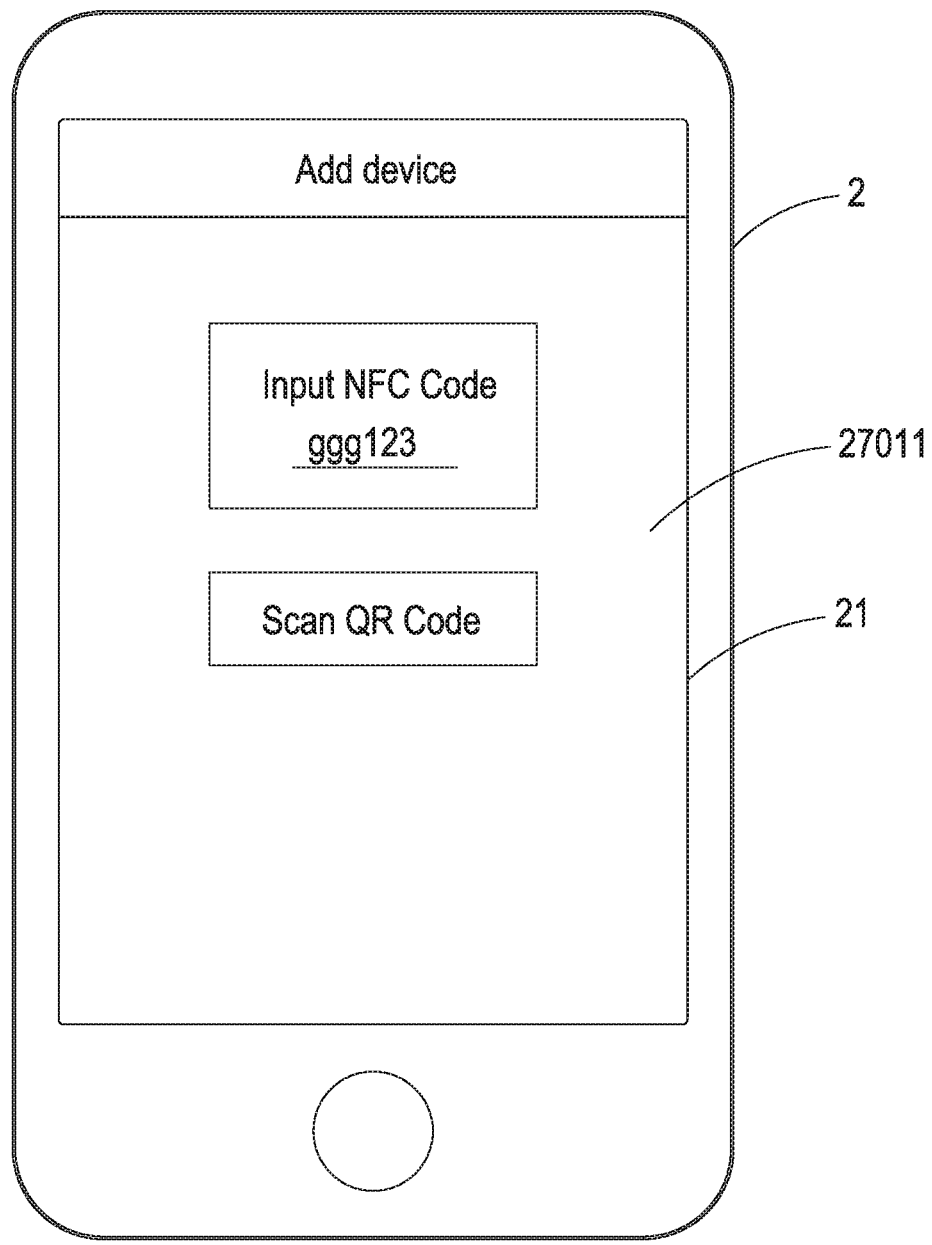
FIG. 4B shows an implementation view of adding devices in the patrol tracking system according to the present invention.
Figure 4C:
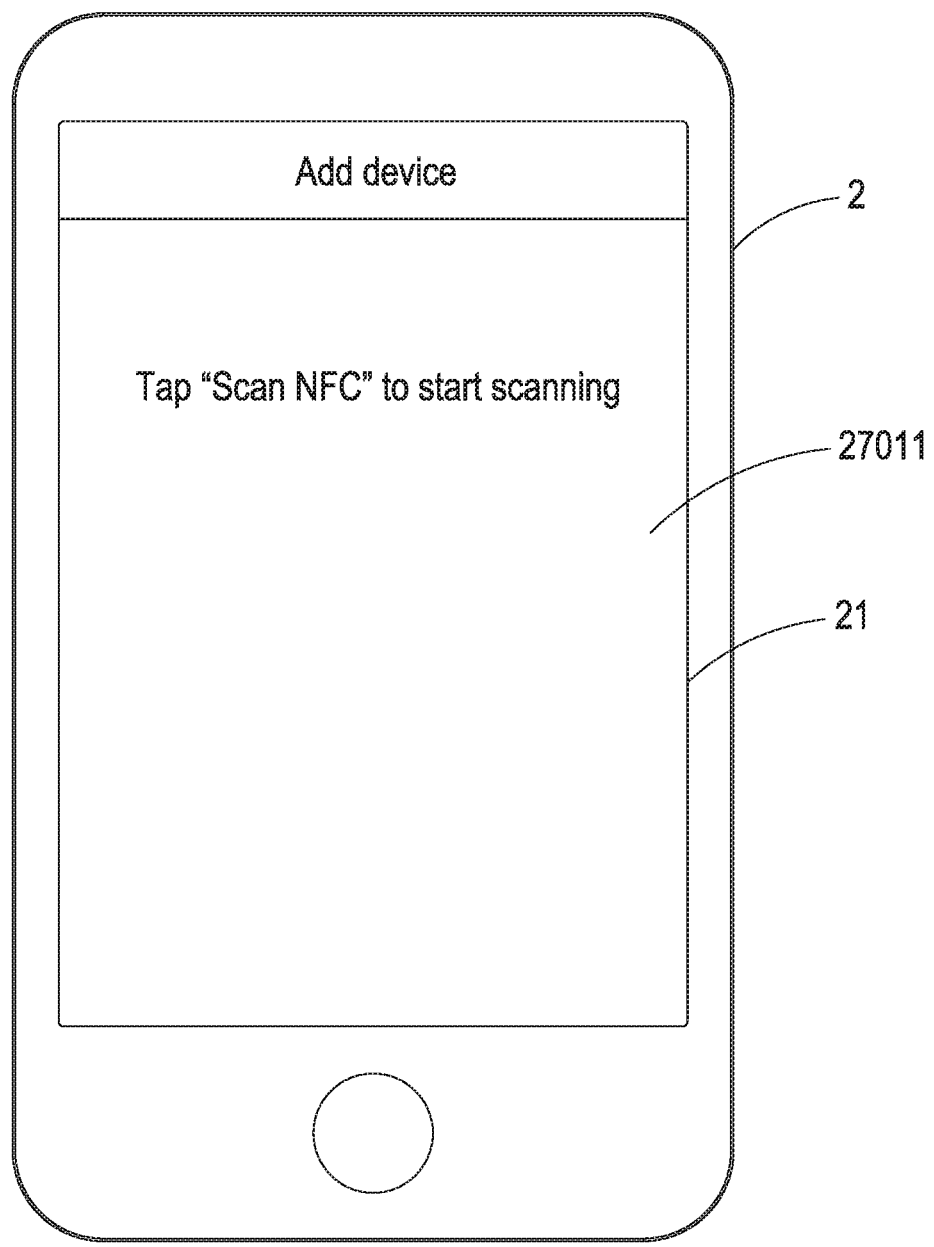
FIG. 4C shows an implementation view of adding devices in the patrol tracking system according to the present invention.
Figure 4D:
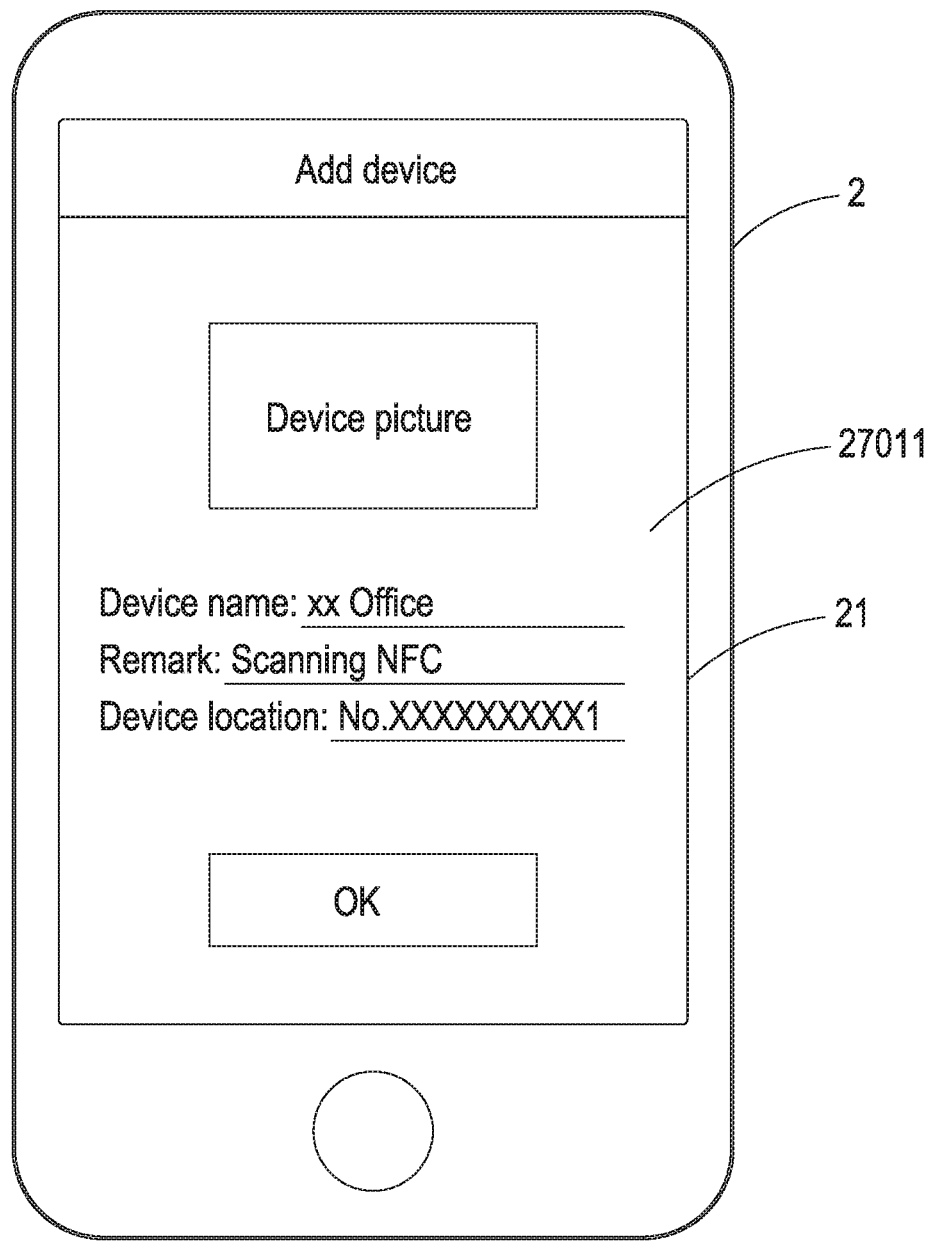
FIG. 4D shows an implementation view of adding devices in the patrol tracking system according to the present invention.
Figure 4E:
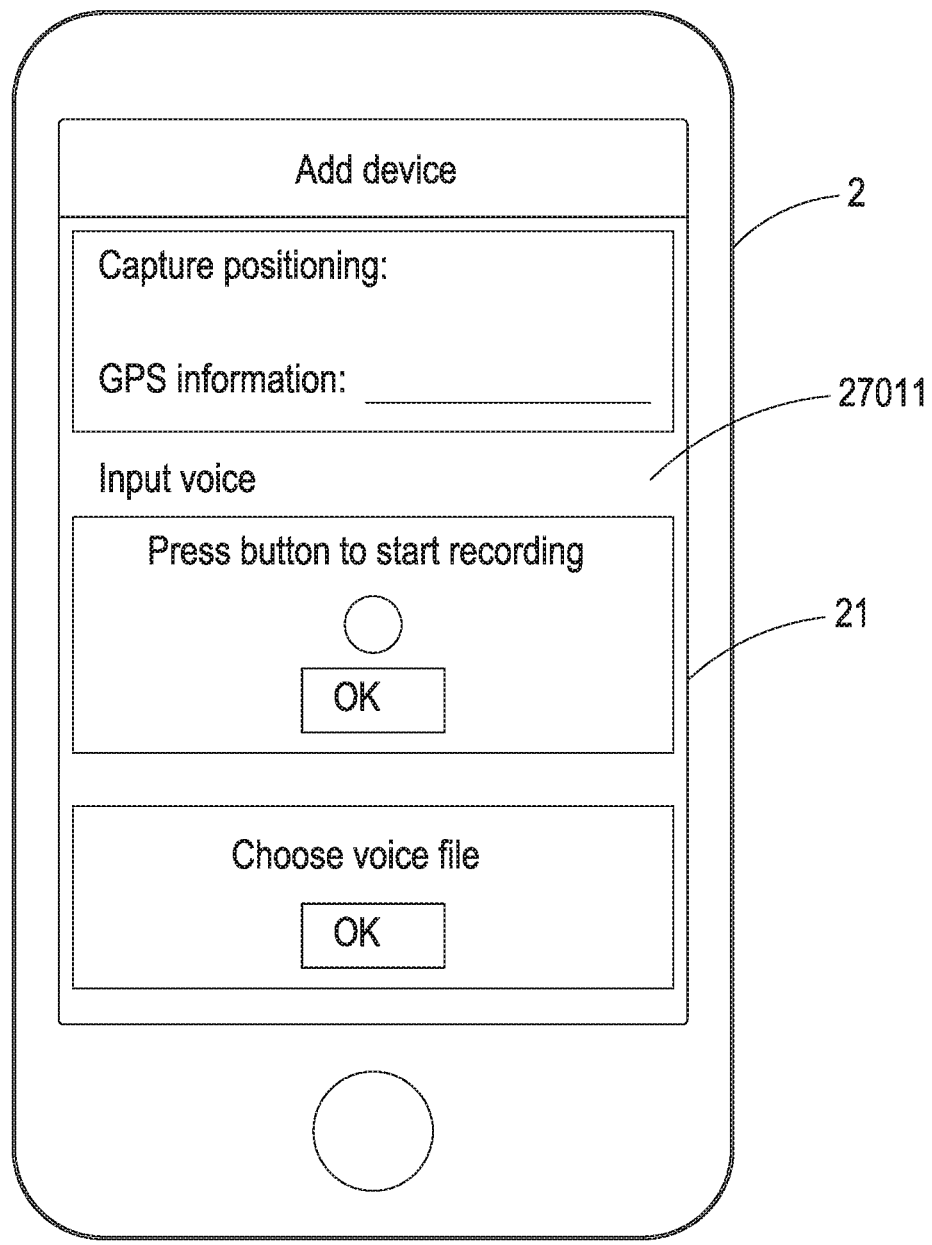
FIG. 4E shows an implementation view of adding devices in the patrol tracking system according to the present invention.
Figure 4F:
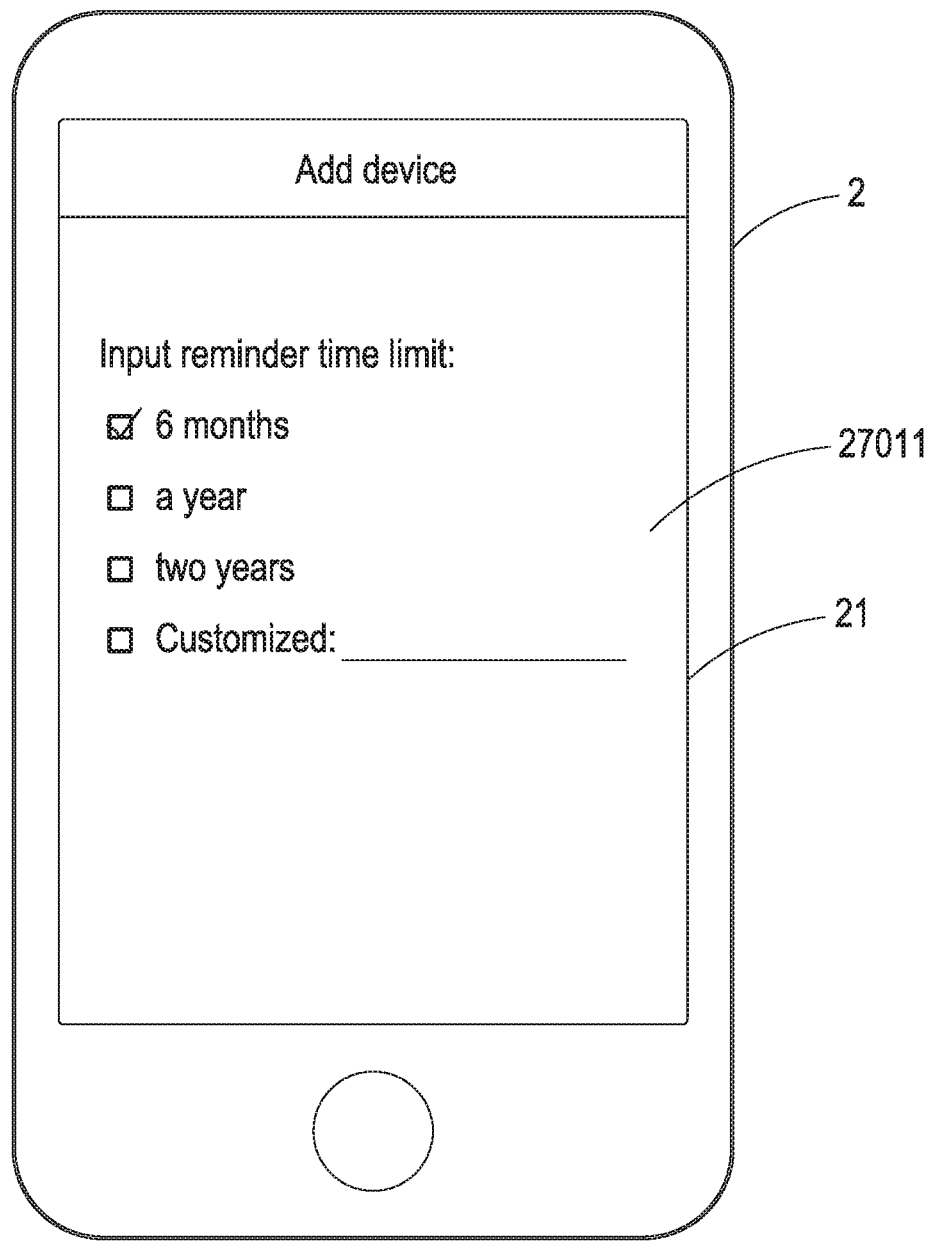
FIG. 4F shows an implementation view of adding devices in the patrol tracking system according to the present invention.
Figure 4G:
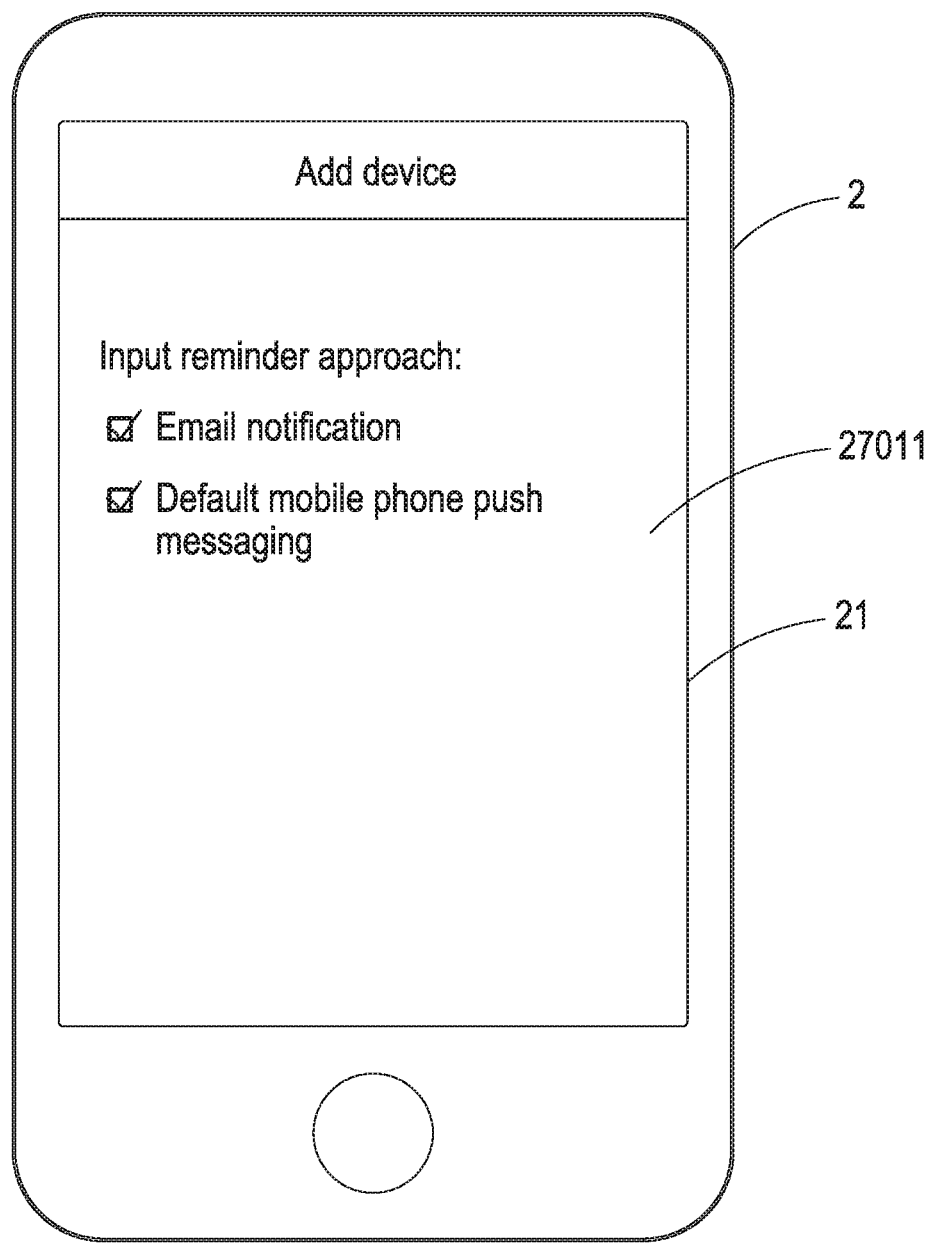
FIG. 4G shows an implementation view of adding devices in the patrol tracking system according to the present invention.
Figure 4H:
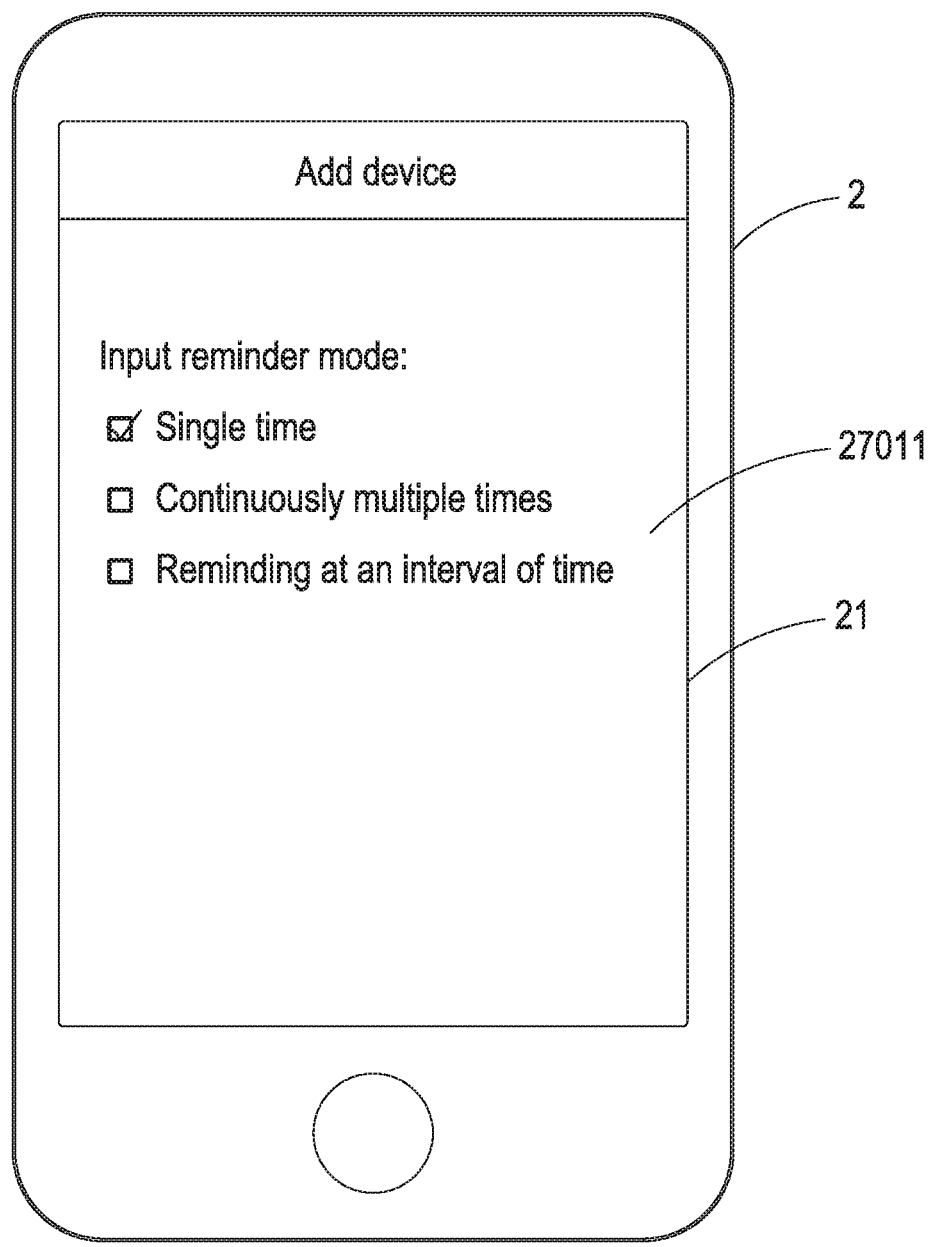
FIG. 4H shows an implementation view of adding devices in the patrol tracking system according to the present invention.

As shown in FIG. 4A, it is required to first enter the administrator's account and password, then, as shown in FIGS. 4B and 4C, the user first inputs or scans the activation label, and is prompted to scan the sticker component in order to acquire the NFC data transferred by the NFC electronic circuit, and then it determines whether the NFC data is identical to the contents of the activation label.

If determined to be identical, as shown in FIGS. 4D-4H, then the user is allowed to enter basic data (probably further including pictures, device name, remarks or device location), GPS location, reminder time limit data, reminder notification approach data, reminder notification number data, wherein the reminder notification approach data may be mobile phone pushes or email deliveries; after completing the setup process, it is possible to create an NFC device setup file based on the aforementioned basic data, reminder time limit data, reminder notification approach data and reminder notification number data, and then upload the created NFC device setup file to the cloud server equipment 3.

Moreover, in addition to uploading the resulted NFC device setup file to the cloud server equipment 3, the control unit 27 may also archive it so that the user may also open the setup file to edit the contents thereof, and then uploads the modified setup file again thereby replacing the previous setup file.

Figure 5:
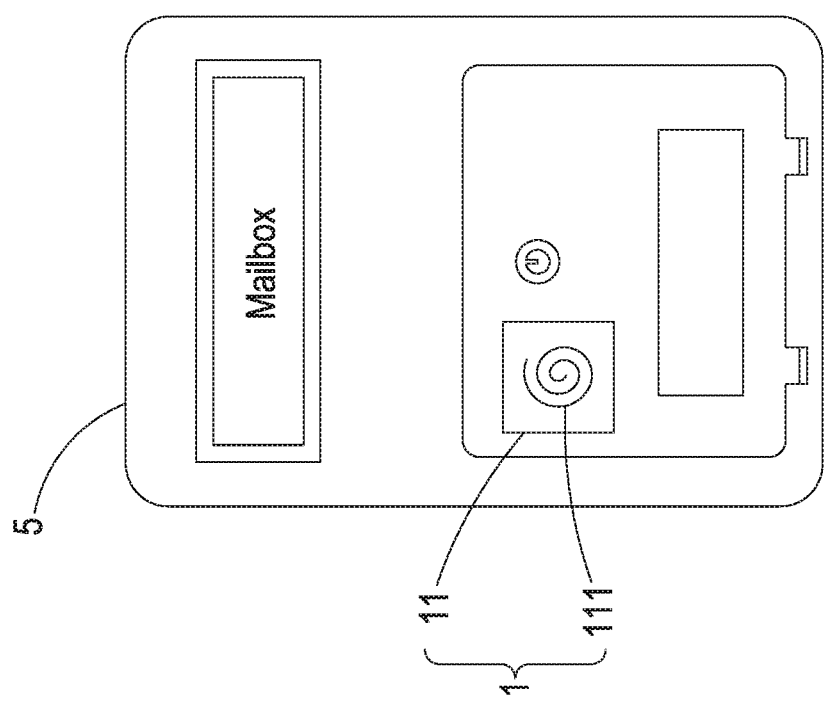
FIG. 5 shows an implementation view of using an NFC carrier in the patrol tracking system according to the present invention.

Moreover, as shown in FIG. 5, since different NFC carriers 1 may have the same activation labels, the manufacturers of the NFC carrier 1 can produce them in a massive fashion, thus, after the administrator attaches multiple sticker components 11 (i.e., the NFC carriers) on the target object 5 (such as a mailbox) at different patrol places, it is possible to establish plural patrol locations required to be inspected; then, the cloud server equipment 3 can automatically or otherwise manually match such different patrol locations and patrollers, and remind different patrollers of the assigned different patrol location for inspections according to the contents configured by the reminder notification approach data and the reminder notification number data.

Figure 6:
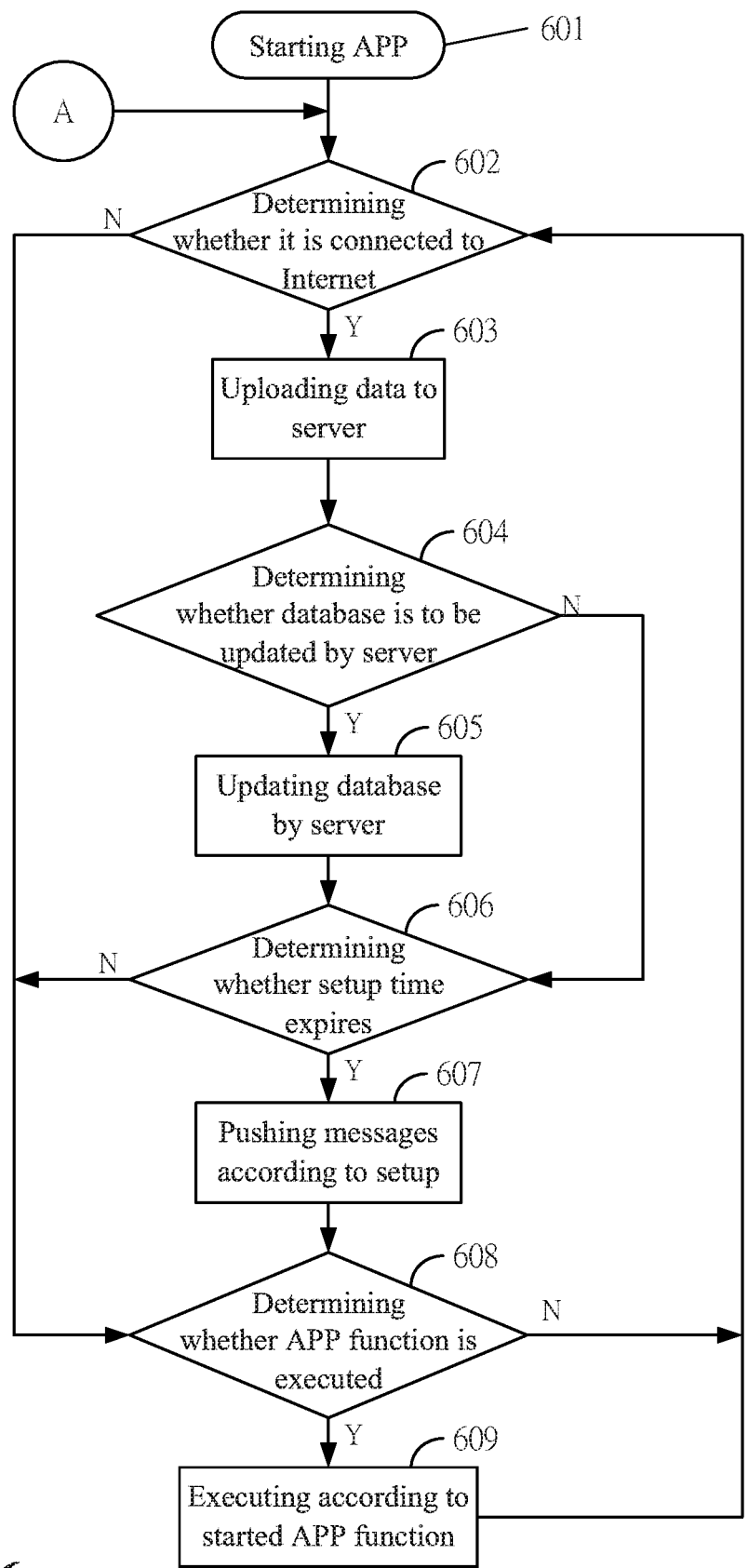
FIG. 6 shows a flowchart of the pushing step in the patrol tracking system according to the present invention.

Subsequently, as shown in FIG. 6, typically when the APP is enabled (601), it will determine first whether the device has been connected to the Internet (602); if YES, the data in the local database (controller unit 27) can be uploaded to the server (cloud server equipment 3) (603), and the server (cloud server equipment 3) determines whether the database needs to update the configured contents (604); if YES, the server (cloud server equipment 3) automatically update the database (605); if NO, however, the process proceeds to STEP (606).

Then, the server (cloud server equipment 3) determines whether the configured time expires (606); if YES, it pushes the message based on the setup data (607); on the other hand, if STEPs (603) and (606) determine NO, or after completing the push message, it determines whether the APP function has been performed (608).

If STEP (607) determines YES, then activating the APP function for execution (609); otherwise, if STEP (607) determines NO, then the process returns to STEP (602).

Figure 7A:
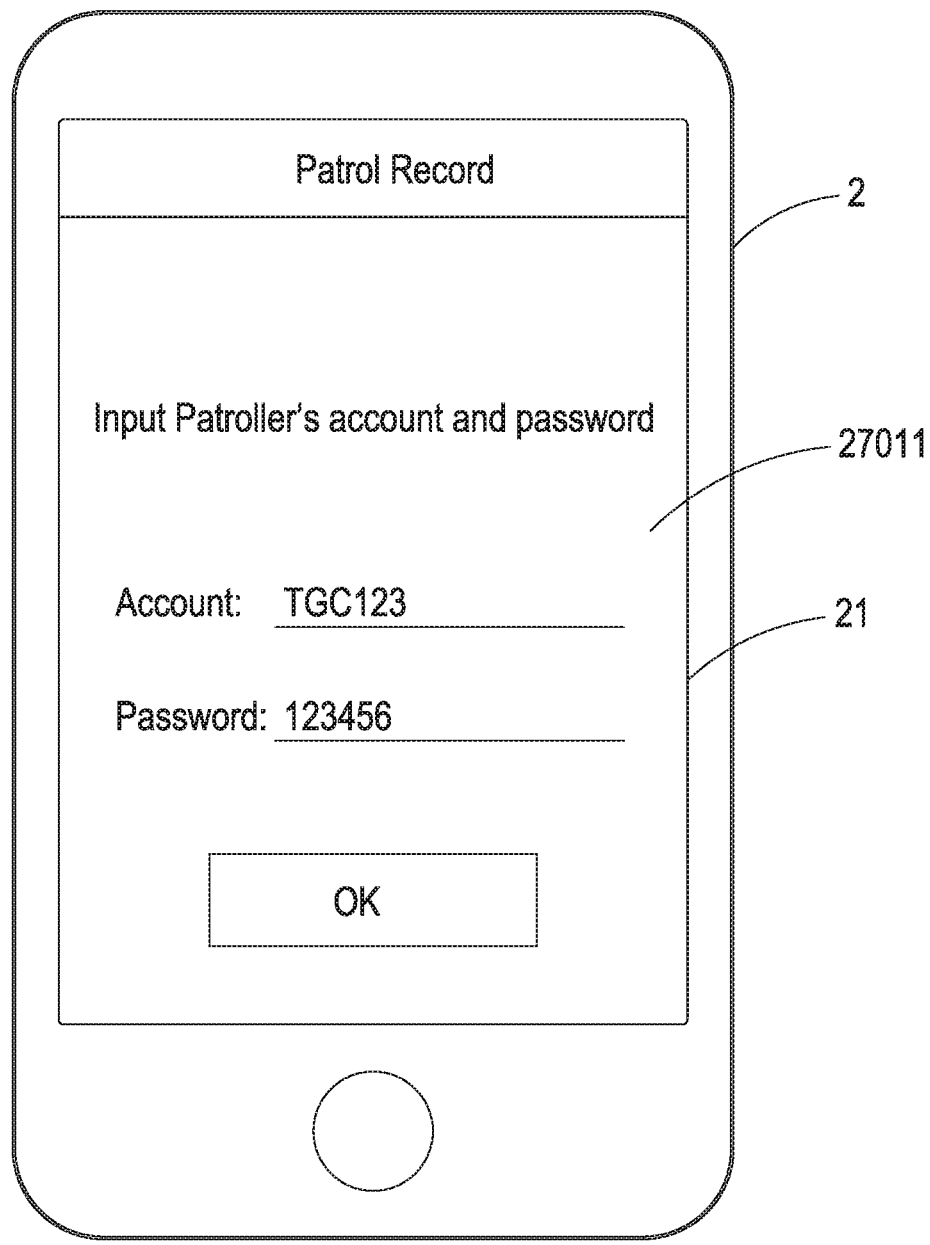
FIG. 7A shows an implementation view of a patrol operation in the patrol tracking system according to the present invention.
Figure 7B:
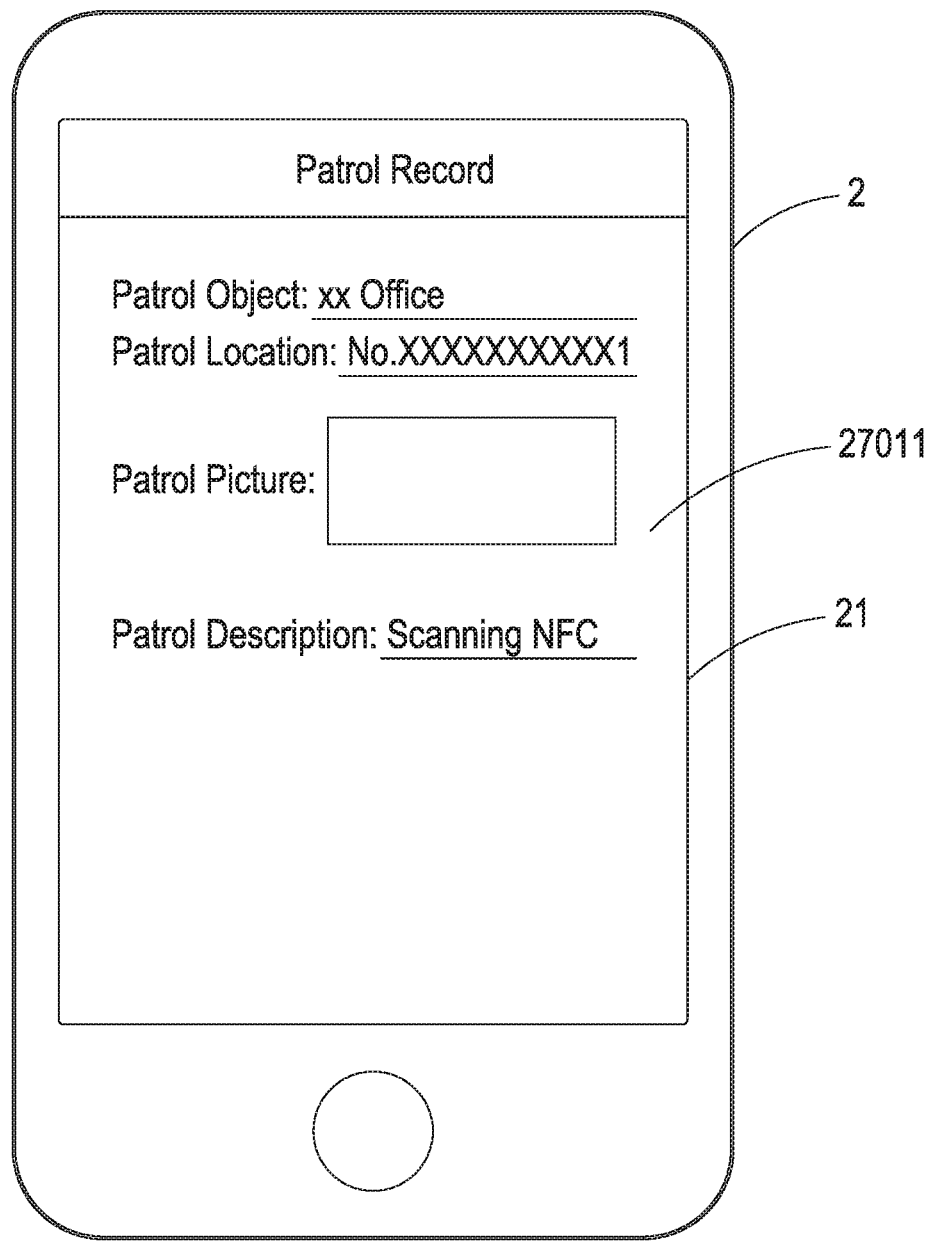
FIG. 7B shows an implementation view of a patrol operation in the patrol tracking system according to the present invention.
Figure 7C:
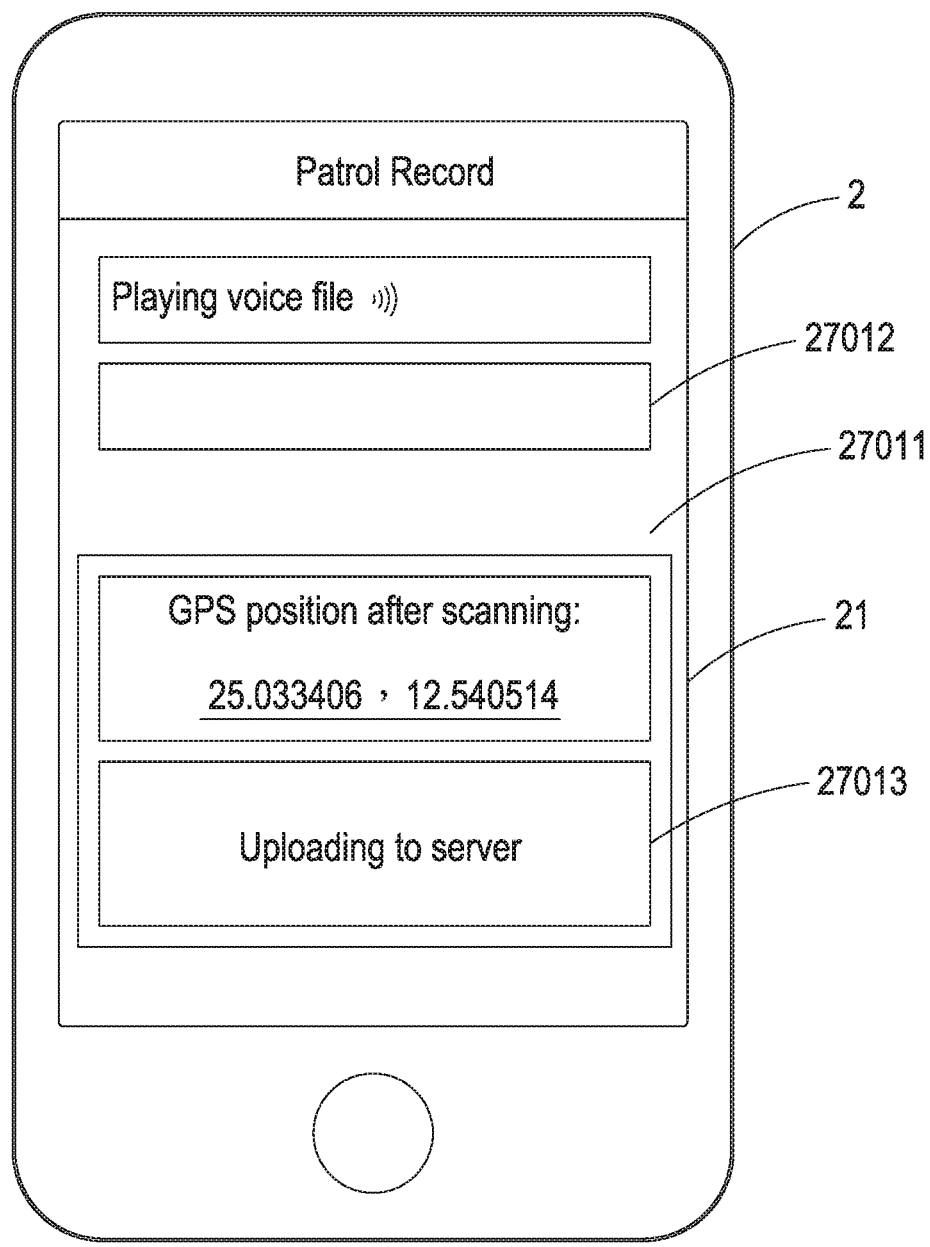
FIG. 7C shows an implementation view of a patrol operation in the patrol tracking system according to the present invention.

Furthermore, as shown in FIGS. 7A-7C, a patroller can log in the account and appreciate the patrol location the patrol regulations (not shown in the Figures, but this may include the reminder time limit data, reminder notification approach data, reminder notification number data), so that, once the patroller arrives at the site and has the NFC carrier 1 scanned, as shown in FIG. 7C, it will play one or more reminder voice files and acquire the GPS position, and message contents such as advertisement, remarks or alerts can be displayed on the message display field 27012 in a marquee mode; then the upload confirmation field 27013 can pressed to start uploading, or else data may be uploaded automatically; after successfully uploading, a response message such as "upload successful" etc. can be shown on the upload confirmation field 27013.

Figure 8:
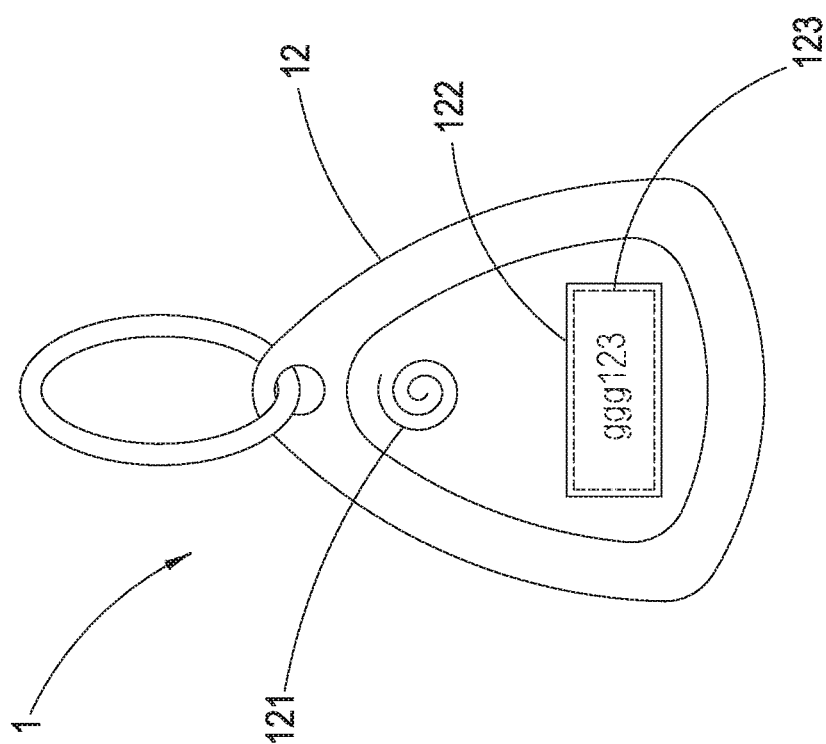
FIG. 8 shows another implementation view of using an NFC carrier in the patrol tracking system according to the present invention.

Besides, the NFC carrier 1 may be a magnetic lock, as shown in FIG. 8, wherein the magnetic lock 12 includes an NFC electronic circuit 121 and a covering 122 can be attached onto the surface of the magnetic lock 12 for covering up the activation label 123 on the surface of the magnetic lock 12 (the activation label 123 may be also printed on the backside of the covering 122), and the magnetic lock 12 can be also used as a key ring ornament.

Figure 9:
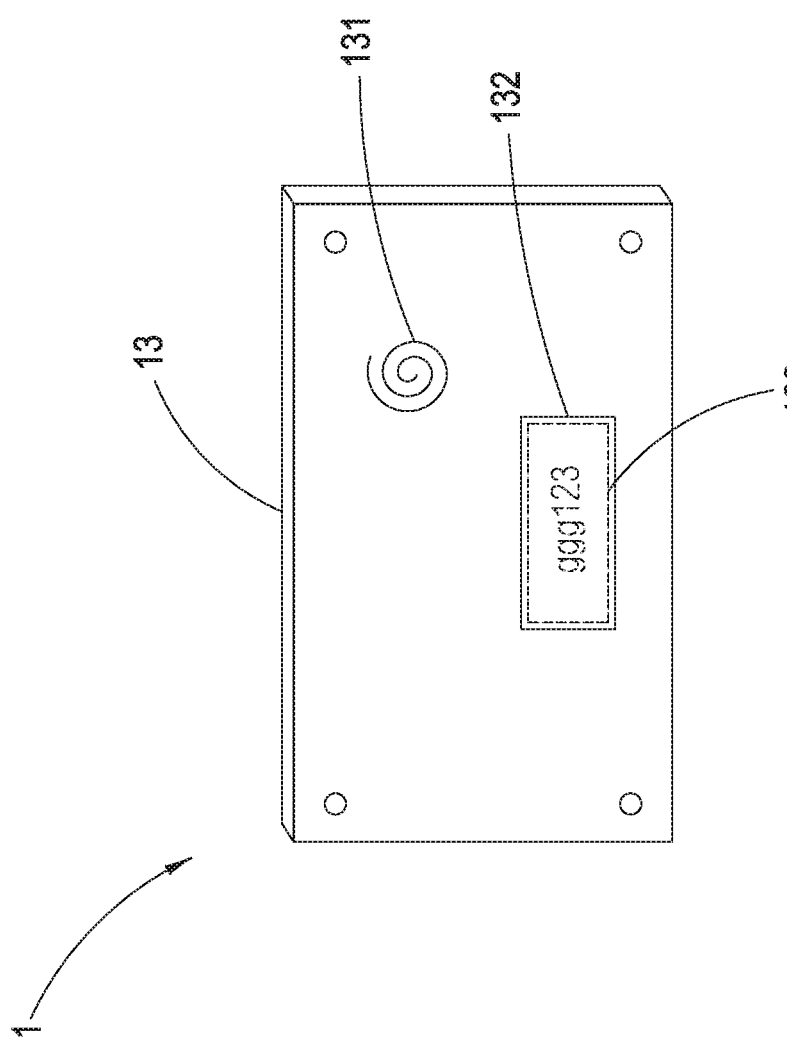
FIG. 9 shows another implementation view of using an NFC carrier in the patrol tracking system according to the present invention.
Figure 10:
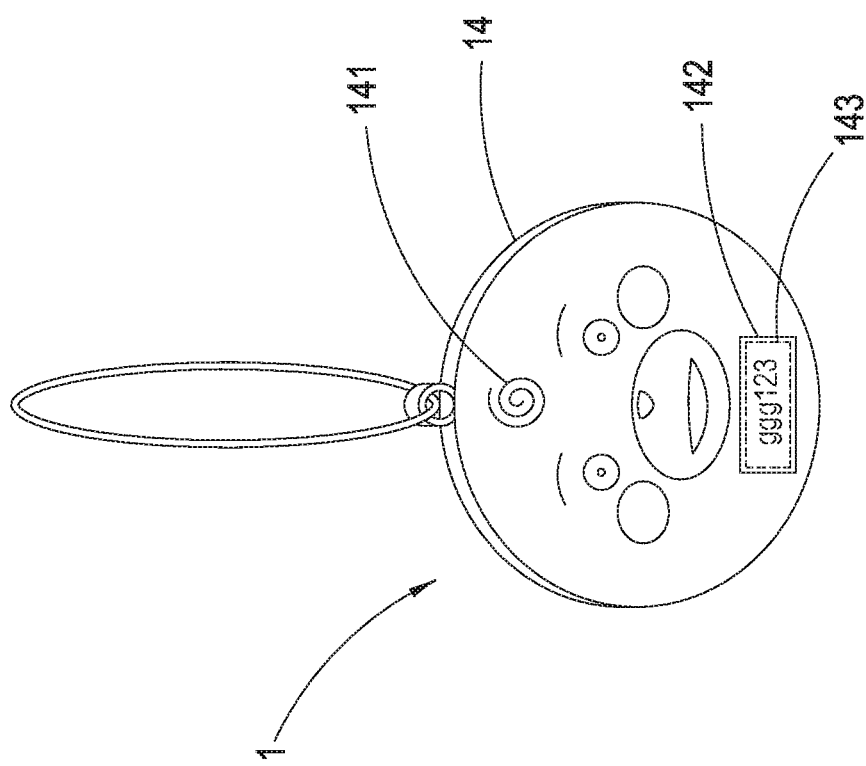
FIG. 10 shows another implementation view of using an NFC carrier in the patrol tracking system according to the present invention.

In addition, the NFC carrier 1 may be a card, as shown in FIG. 9, in which the card 13 has an NFC electronic circuit 131 and a covering 132 is attached to the surface of the card 13 in order to cover up the activation label 133 on the surface of the card 13 (but the activation label 133 may be also printed on the backside of the covering 132.)

Or, the NFC carrier 1 may be a pendant 14, as shown in FIG. 8, in which the pendant 14 includes an NFC electronic circuit 141 and a covering 142 is attached to the surface of the pendant 14 in order to cover up the activation label 143 on the surface of the pendant 14 (but the activation label 143 may be also printed on the backside of the covering 142.)

After uploading, the system can match automatically based on the GPS location and generate a patrol record list from the uploaded patrol record data, as exemplarily illustrated in Table 1 hereunder:

TABLE 1

Name: XX Office
Patrol Location: No. XXXXXXXXXX1

| Patroller | Account | Patrol Date | Patrol Time | Patrol Coordinate |
|---|---|---|---|---|
| Mr. A | TGC123 | Jun. 1, 2017 | PM8:00 | 25.033406, 121.540514 |
| Mr. A | TGC123 | Dec. 1, 2017 | PM8:00 | 25.033406, 121.540514 |
| Mr. B | TGC456 | Jun. 1, 2018 | PM8:00 | 25.033406, 121.540514 |

Therefore, the present invention can be widely applied to the various sorts of fields, such as police and security patrols, regular maintenance or repair for mechanical or electronic equipments, warehouse logistics, property management, fire safety facility patrols, construction and engineering safety facilities patrols or other areas requiring patrol and inspection procedures or the like; but it should be understood that the application areas herein listed are merely certain preferred embodiments of the present invention which are not intended to limit the scope of the claims set forth in the present application.

In comparison with other conventional technologies, the patrol tracking system according to the present invention provides the following advantages:

(1) The present invention enables the GPS mechanism so that the back-end administrator can clearly and precisely appreciate whether the patrol and scanning location of the patroller is correct thereby effectively controlling and managing the actual patrol states of different patrol sites.

(2) The present invention allows to place multiple NFC carriers at different patrol locations and, along with corresponding electronic device software, it is possible manage and control required patrol time and patrol information concerning different patrol locations, so that, when the patrol time is near, the patroller can be timely informed of a reminder message for relevant patrol and inspection operations.

(3) The present invention can, after the patroller arrives at the assigned patrol location and then scans the NFC carrier, create a patrol record file and upload it to the cloud thereby generating a report such that the back-end administrator can control and manage the patrol conditions of different patrol locations anytime.

(4) The present invention can further irregularly receive GPS coordinates (Global Positioning System) so as to track whether the patrol operation itineraries of the patrollers comply with the regulations in real time, and related tracking records can be used as a part of performance assessments for evaluating their task executions.

(5) The present invention also provides the voice replay function, indicating that, when the patroller scans the NFC carrier, it will synchronously play a reminder voice file corresponding to the patrol location thereby reminding the patroller of relevant note items at that site.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention within the spirit and scope thereof. Hence, the scope of the present invention to be protected under patent laws should be delineated in accordance with the claims set forth hereunder in the pre sent specification.

What is claimed is:

1. A patrol tracking system, comprising:
    an NFC carrier, internally having an NFC circuit which corresponds to an activation label, and installed at a patrol location;
    a handheld device, including a screen unit, a GPS unit, an NFC scanner unit and a control unit, wherein the control unit is connected to the screen unit, the GPS unit, and the NFC scanner unit, and the handheld device comprising:
    an interface management module, used to provide multiple operation interfaces shown on the screen unit;
    an account log-in module, connected to the interface management module for logging in a user account;
    a data archive module, connected to the account log-in module for creating an NFC device setup file, in which the NFC device setup file includes an NFC data, a basic data, patrol location coordinates and/or setup picture file;
    an identification authentication module, connected to the NFC scanner unit, the interface management module and the data archive module, and used to input or scan one or more activation labels on the operation interface, and, after scanning the NFC carrier by means of the handheld device, capable of acquiring the NFC data transferred by the NFC circuit, so that the identification authentication module can determine whether the NFC data is identical to the contents of the activation label;
    a basic data setup module, connected to the interface management module, the identification authentication module and the data archive module, which, after the identification authentication module determining that the NFC data is identical to the contents of the activation label, is able to input one or more basic data on the operation interface;
    a coordinate setup module, connected to the GPS unit, the interface management module and the data archive module, and used to acquire one or more patrol location coordinates via the GPS unit;
    a patrol confirmation module, connected to the NFC scanner unit, the GPS unit and the interface management module, and used to scan the NFC carrier so as to, after completing the scanning, generate a patrol record file which includes at least the patrol location coordinates and scanning time points; and
    a data upload module, connected to the data archive module and the patrol confirmation module, and used to upload the NFC device setup file and the patrol record file; and
    a cloud server equipment, connected to the control unit of the handheld device, comprising:
    an account management unit, used to store and establish one or more user accounts and passwords, in which the user account is the account of the administrator and/or the patroller;
    a setup file storage unit, used to receive and store one or more NFC device setup files which correspond to the account of an administrator; and
    a patrol record unit, connected to the setup file storage unit in order to receive and store one or more patrol record files, and capable of matching the NFC setup file which the patrol record files correspond to in the setup file storage unit based on the contents of the patrol location coordinates and accordingly generating a patrol record list;
    wherein the handheld device further includes a microphone unit and a speaker unit connected to the control unit, and the control unit also further includes voice setup module connected to the microphone unit, the interface management module and the data archive module for recording or choosing one or more reminder voice files; then, after scanning the NFC carrier by means of the patrol confirmation module, the reminder voice files can be played via the speaker unit.

2. The patrol tracking system according to claim 1, wherein the handheld device further includes a camera unit connected to the control unit, and the control unit also further includes a picture setup module connected to the camera unit, the interface management module and the data archive module for photographing or choosing one or more setup picture files.

3. The patrol tracking system according to claim 1, wherein the control unit further includes an information display module connected to the interface management module for displaying one or more information contents on the operation interface, and such information contents may be texts, images, symbols or a combination of at least two of them.

4. The patrol tracking system according to claim 1, wherein the cloud server equipment further includes a patrol reminder unit connected to the setup file storage unit thereby determining whether the configured reminder time is near or expires based on the contents consisting of a reminder time limit data, a reminder notification approach data and a reminder notification number data so as to send out a reminder message.

5. The patrol tracking system according to claim 4, wherein the patrol reminder unit sends out the reminder message by way of mobile phone texting or email deliveries.

6. The patrol tracking system according to claim 5, wherein the control unit further includes a reminder time limit setup module connected to the interface management module and the data archive module for inputting or choosing one or more reminder time limit data.

7. The patrol tracking system according to claim 5, wherein the control unit further includes a reminder notification approach setup module connected to the interface management module and the data archive module for inputting or choosing one or more reminder notification approach data.

8. The patrol tracking system according to claim 5, wherein the control unit further includes a reminder notification number setup module connected to the interface management module and the data archive module for inputting or choosing one or more reminder notification number data.

9. The patrol tracking system according to claim 1, wherein the NFC carrier is a sticker component, a magnetic lock, a key ring, a pendant or a card.

\* \* \* \* \*